United States Patent [19]

Bomhard et al.

[11] Patent Number: 4,884,711
[45] Date of Patent: Dec. 5, 1989

[54] CONTAINER SYSTEM FOR THE STORAGE OF WASTES

[75] Inventors: Helmut Bomhard, Starnberg; Ernst Fischer; Dieter Rudat, both of Munich, all of Fed. Rep. of Germany

[73] Assignee: Dyckerhoff & Widmann AG, Munich-Riem, Fed. Rep. of Germany

[21] Appl. No.: 210,510

[22] PCT Filed: Sep. 16, 1987

[86] PCT No.: PCT/EP87/00528
§ 371 Date: May 18, 1988
§ 102(e) Date: May 18, 1988

[87] PCT Pub. No.: WO88/01913
PCT Pub. Date: Mar. 24, 1988

[30] Foreign Application Priority Data
Sep. 18, 1986 [DE] Fed. Rep. of Germany ....... 3631807

[51] Int. Cl.⁴ .................................................. B09B 1/00
[52] U.S. Cl. ..................................... 220/5 A; 220/469
[58] Field of Search .................. 220/5 A, 83, 400, 469, 220/901

[56] References Cited

U.S. PATENT DOCUMENTS

| | | | |
|---|---|---|---|
| 4,307,814 | 12/1981 | Ihira | 220/5 A |
| 4,390,040 | 6/1983 | Beyen | 220/469 X |
| 4,638,920 | 1/1987 | Goodhues | 220/5 A X |
| 4,715,513 | 12/1987 | Shelton, Jr. | 220/409 |

*Primary Examiner*—John Fox
*Attorney, Agent, or Firm*—Wolf, Greenfield & Sacks

[57] ABSTRACT

This container system is designed in such a way that wastes which cannot be differentiated according to their effects can be stored for an indefinite period in the system which is self-contained and hence cut off from the environment, and these wastes can also be recovered at any time without polluting the environment. For this purpose this container concept is designed as a double-walled system, consisting of an inner container (2) as a casing for the waste and an outer container (1) as a protective container, with an air space as an inspection and working chamber (4) between the two. The inner container (2) is designed in such a way that it can be visually, mechanically, chemically and/or biologically checked, repaired and renewed completely and on all sides at any time while full.

22 Claims, 4 Drawing Sheets

CONTAINER SYSTEM FOR THE STORAGE OF WASTES

TECHNICAL FIELD OF THE INVENTION

The invention relates to the preparation and long-term running of waste dumps, in particular a container system for this purpose.

DISCUSSION OF THE STATE OF THE ART

Known designs of containers for the storage of wastes can be characterised as follows:

1. On a conventional base seal such as is realised in underground dumps, are erected single or several reinforced concrete containers of circular. hexagonal or rectangular outline. In general they have single-shell reinforced concrete walls and are given a weatherproof cover to avoid entry of rain water. Provision is also made for the application of single or multi-layer sealing coats, possibly with plane inspection surfaces in between, on these concrete walls and on the mineral or solid floor of the structure.

These types of waste stores have a few essential disadvantages:

(a) Preliminary treatment, solidification and in many cases even drying are prerequisites for storage of the wastes.

(b) The container is checked for sealing tightness most extensively by so-called leak indicator layers. Automated checking of this kind entails the risk of failure during the lifetime of the store. At best, the outsides of the outer walls of the containers are accessible to visual checking which can be repeated indefinitely.

(c) Even a multi-layer design of the sealing systems does not restrict the defect described under (b). Possibly it offers a delay in time of failure of the seal, as no materials for the encasement of wastes which have unlimited resistance to the various types of chemical and/or biological attack have existed up to now, on account of the nature of the waste materials.

(d) Even if it is assumed that the leak indicator system is still functioning at the time of damage, there can be no controllable elimination of the damage while the container is full. Complete or partial emptying of the waste store for the purpose of repair leads to new storage and environmental problems on account of the composition of the waste, which generally defies definition.

(e) The only possible method of repair available while the store is full is subsequent injection of the leaking area, by grouting the leak indicator layer in a certain area. Apart from the open question of the material for this injection, the process is innately fraught with a number of imponderable questions. Checking whether the whole space between a damaged barrier layer and one which is hopefully still intact, is not possible selectively. Due to the fact that at least one of the adjoining sealing skins has a leak, injected material passes in quantities which cannot be measured into neighbouring regions which are not meant to be injected at all. As the injection of thin layers can take place efficiently only under high pressures, there is a risk of additional damage occurring at the boundaries between layers. Furthermore it is basically questionable whether the injection pipes or hoses installed on erection of the apparatus are still functioning at the time of the damage occurring. Finally, the sealing action of the injected material must also be questioned, as other materials do not adhere to the sealing skins which enclose a leak indicator layer and which are generally made of polyethylene or the like, on account of the anti-adhesive properties of these plastics. Thus the required bonding effect cannot be achieved between the sealing skin and the injected material. As a result there is a risk of this injected layer floating or trailing.

2. Other storage systems for wastes also have, in modification or completion of those described under 1, a floor which can be walked upon, which generally consists of a multiple-support reinforced concrete slab and which on the waste side is again covered with one or more sealing layers, with leak indicator layers in between in certain circumstances. Here, as described under 1(b), visual checking is of course possible on the side of the floor facing away from the waste. The same reservations as described under 1(b)–(e) apply to repair of the leak in the seal with the load-bearing floor remaining.

3. According to one particular embodiment of a floor which can be walked upon as in 2, this is formed from a plurality of load-bearing members whose mounting is statically determined and which are separated by joints and, again, covered on the waste side with single or multi-layer sealing coats. Tracing of damage to an affected member is not possible with this construction. Only when the load-bearing part of the floor exhibits visible impairment does damage to the seal become obvious, without it being thus possible to determine its exact position conclusively.

Major repairs to the sealing coats basically require the dismantling of individual load-bearing members. This can be done only if the waste located above it is in some way stabilised so that it does not cave in during dismantling. This is perhaps technically possible. Nevertheless the sealing coats remain at the actual site of installation. Thus e.g. to repair the seal on the waste side, the one underneath would have to be removed as well, although it is possibly undamaged. Repair of the seals which lie directly adjacent to their foundation such as waste, gravel or other extraneous materials, might at the very least pose technical problems: i.e., only limited demands of quality can be made of such a repair.

4. In the field of materials for linings of dumps, various types of plastics and/or mineral seals are in use or being tested for their suitability. Whereas presumably a suitable material can always be found in case of precise definition of the substances attacking the surrounding seal, things are essentially more complicated in the case of the waste. Since on the one hand separation of the wastes into different materials is at least at present not technically feasible, but on the other hand nor is there any material in existence which is resistant in the long term to all known attacks from the mixed waste, let alone substances which may form in the future but are still unknown today, the problem of storage of untreated wastes cannot be solved by the material alone.

5. In waste disposal, according to the present state of knowledge it is possible to put forward three concepts of disposal.

(a) The waste is prepared by preliminary treatment (e.g. chemically, physically, thermally or biologically) in such a way that its residues do not require any further treatment.

(b) The waste is immobilised by a certain type of preliminary treatment at very high temperatures, i.e. the mineralised and dry residues are not corrosive if their consistency is maintained.

(c) The waste can be neither selectively separated into materials nor pretreated adequately.

For safe storage of the waste residues according to these three concepts, there are three types of waste stores with regard to the avoidance of any environmental hazard.

(aa) Waste store under concept (a)

This store does not pose any problems because on the one hand it does not make demands on safety, but on the other hand no such technique of treatment has existed up to now.

Burning does not by any means meet the requirements according to concept (a), as experience in recent years has shown that even if the slag and residues are stored, there are most certainly safety risks from flue gas purification.

(bb) Waste store under concept (b)

Preliminary heat treatment of the wastes in such a way that all organic constituents are burnt and the residues mineralised, dry and therefore immobilised, does not yet exist at present. But as such burning techniques are being developed, realisation in the near future would seem to be conceivable. The corresponding waste store must ensure maintenance of immobility of the residue of burning. This means keeping the waste dry and the possibility of checking which can be repeated at any time and repair of the components which make this possible, and also the possibility of recovery of the wastes.

(cc) Waste store under concept (c)

Waste which has not been pretreated according to this concept and from which only, as far as possible, its reusable constituents (recycling) have been removed by sorting, quite overwhelmingly constitutes the present-day reality. The capacities of existing combustion systems are far from sufficient for treatment of the quantities of waste produced. Also, the combustion and flue gas residues of existing systems have to be stored safely, as they contain pollutant constituents.

The waste store for this untreated waste must, from the environmental and safety point of view, meet the minimum requirements of

- possibility of regular checking
- possibility of repair which can be repeated at any time
- possibility of repeated renewal in certain circumstances, and
- possibility of recovery of the wastes.

DESCRIPTION OF THE INVENTION

The invention is concerned first and foremost with concept (c) and sees itself the object of elaborating a proposal for storing waste of the kind claimed without placing any burden on or even endangering the environment in the long term, with technically feasible and economically justifiable means.

For this the invention proposes a container system which is designed in such a way that wastes which cannot be differentiated according to their effects and which can attack and destroy the material of the system, can be stored safely for an indefinite period in a system which is self-contained and hence cut off from the environment, for which purpose the system is such that in case of expected destruction of the encasing material, encasement can nevertheless be guaranteed reliably, and these wastes can also be recovered at any time without polluting the environment.

Taking into account the current technical possibilities and known materials, the situation in the field of waste disposal therefore results in requirements of the waste store which relate to the whole container system including possibilities of checking and repair, and which are formulated in more detail above. For the reasons stated, these requirements can be met not by the material alone, but by the container system. This is a new technical concept which requires general solutions different to those which were common up to now.

This container system to be produced by technically feasible and economically justifiable means then, however, allows long-term storage of untreated waste, taking into account environmental and safety requirements.

Further advantageous developments of the concept according to the invention are apparent from the statements below.

The container system can be designed as a double wall, in a manner known in the art. In this case, however, the inner container has a special construction: for it is designed in such a way that it can be visually mechanically, chemically and/or biologically checked, repaired and renewed completely and on all sides at any time while full. This concept meets the requirement that the safety standards should be met in spite of the unpredictability of service life of the materials used on account of attack by partly unknown substances of the stored waste.

One concrete solution for the structure of the required inner container lies in that the inner container is designed with several layers and constructed from an outer load-bearing casing, a lining layer arranged on the inner surface thereof, and an inner filter layer.

For favourable load bearing with suitable wall thicknesses and use of materials and for easy checking and repair of the inner container, advantageously the casing of this inner container consists of narrow elements of the height of the wall in the wall region, and narrow elongate elements in the floor region, which are supported against the casing of the outer container by supporting elements offset from each other.

Another advantageous concept of the solution according to the invention lies in that the supporting elements can be exchanged for hydraulic or mechanical supporting elements, by means of which the elements of the wall and/or floor of the inner container can be pulled or lowered individually into the working chamber and there repaired or renewed. As a result, more expensive hydraulic or mechanical supporting elements are needed only in a small number; they are used only for the purpose of the work claimed.

It is also part of the concept according to the invention that the operating systems for charging, discharge, ventilation, chamber air monitoring, and collection and removal of gas and percolating water, are accommodated in the inspection and working chamber, and the last two in certain circumstances also inside the inner container.

In this connection, the casing of the inner container can be provided with inspection openings leading to the lining.

Furthermore, according to the invention several dump containers together with a stairwell and conveyor tower may form a group, and several groups may form a whole dump container plant.

The container system according to the invention can finally according to concept (b) also be designed for pretreated, mineralised wastes. In this case it is important that the protective means against entry of moisture can be checked and repaired at any time for an indefinite period.

DESCRIPTION OF EMBODIMENTS OF THE INVENTION

Figure 1:
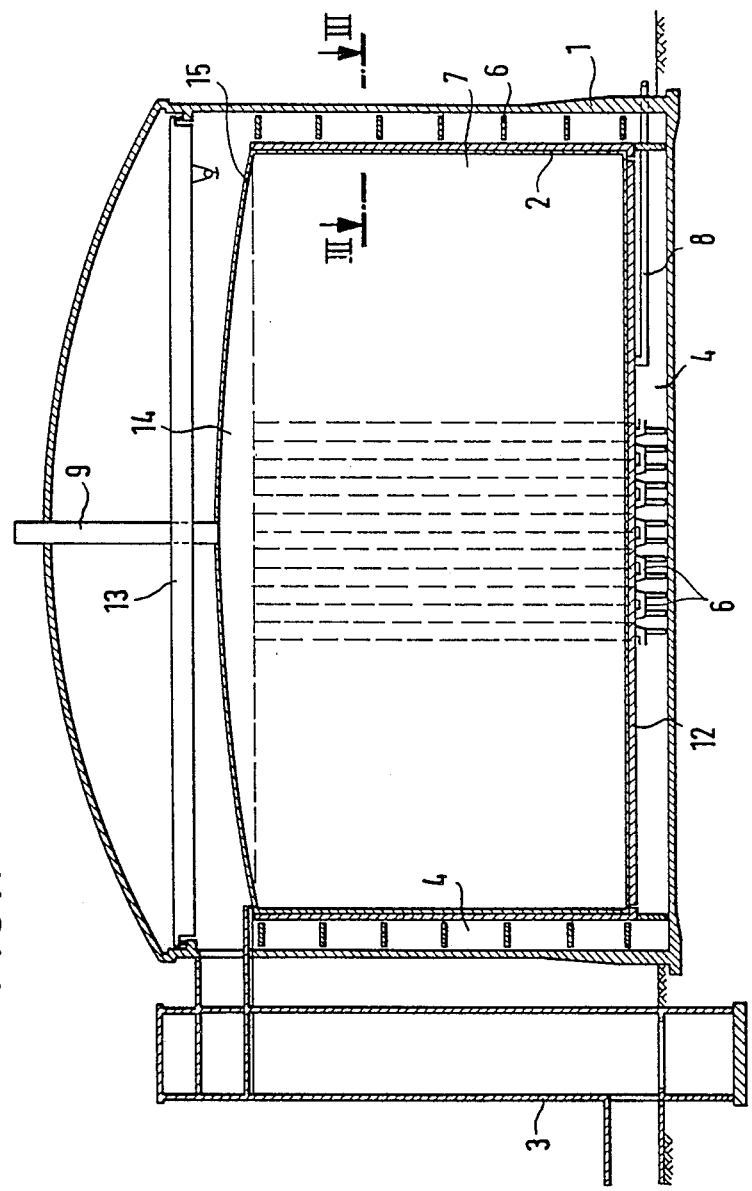
Figure 2:
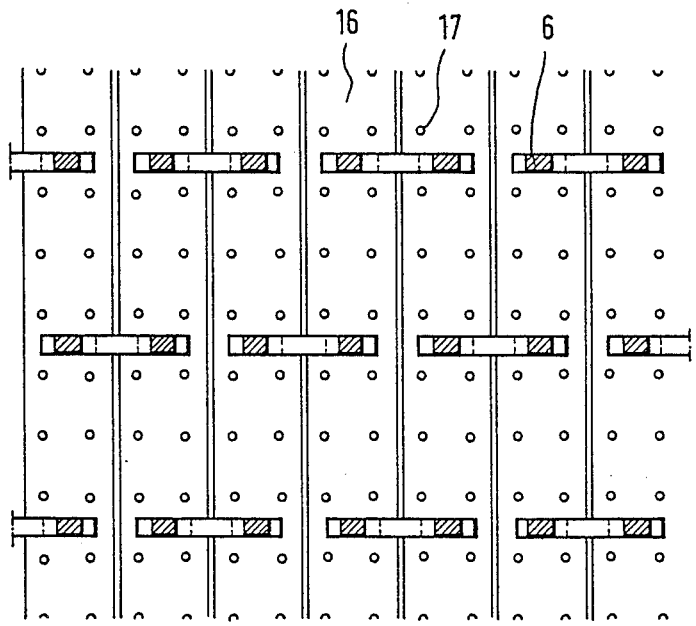
Figure 3:
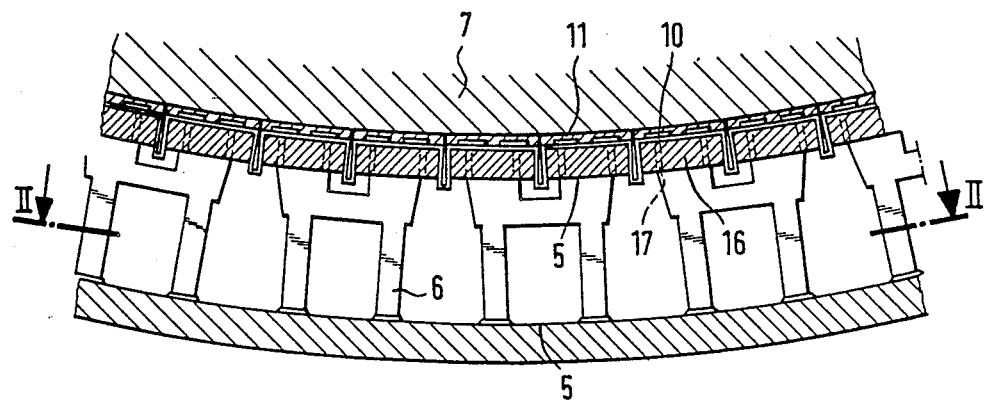
Figure 4:
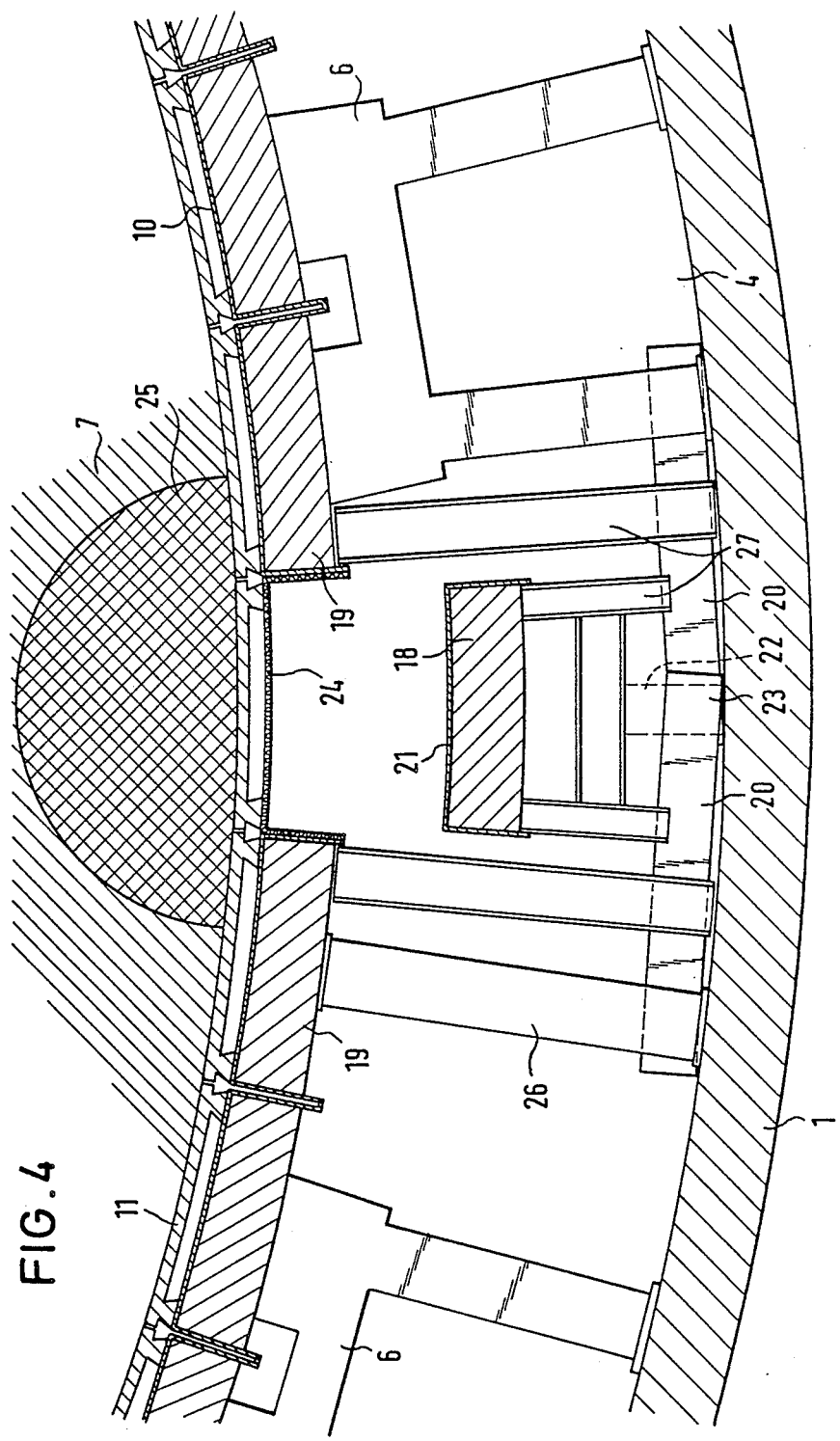
Figure 5:
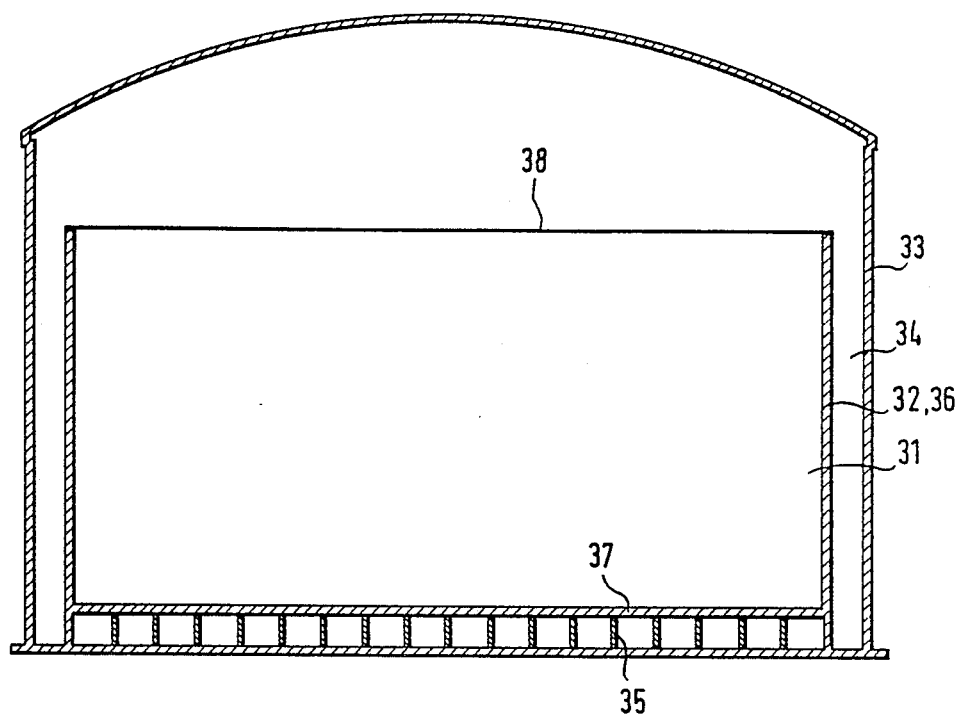

Further details and advantages of the invention are explained below with reference to embodiments shown in the drawings. These show:

FIG. 1 in a schematic view an axial section of the container system according to the invention, FIG. 2 a section through II—II in FIG. 3, FIG. 3 a section through III—III in FIG. 1, FIG. 4 in a schematic horizontal section the portrayal of a repair process, and FIG. 5 in axial section a simplified embodiment of a container system according to the invention.

The container system for untreated wastes (FIG. 1) comprises two containers one inside the other (1, 2).

The outer container (1) is a monolithically manufactured single-shell, prestressed concrete construction which has the objects of:
keeping external influences such as wind, precipitation, etc. away from the inner chamber,
controlling extraordinary external attacks on the structure which are possible in certain circumstances (e.g. by earthquake)
cutting off an inspection and working chamber (4) from the outside
bearing the loads coming from the inner container (2) via supporting elements (6) and transmitting them to the foundation, and
encasing in the system the environmental pollutants emanating from the waste (inter alia gases and odour).

The outer container may be provided on the inside with a concrete-protecting coating (5) (FIG. 3) which can also be extended to all concrete components as far as the inspection and working chamber (4).

The inner container (2) has the objects of:
enclosing a waste chamber (7) with the waste,
keeping chemical, biological and mechanical attacks emanating from the waste away from the other components by a seal (10),
accepting loads locally through the waste and transmitting them to the supporting elements (6), and
collecting and encasing percolating water and dump gas produced in the waste, and conducting them away through corresponding pipes (8, 9).

For these purposes the inner container (2) has a multilayer structure consisting of load-bearing reinforced concrete wall and floor elements (16) and (12), sealing plates (10) forming the above-mentioned seal or the liner (lining layer), and filter plates (11) (filter layer) (see FIGS. 2 and 3).

Division of the load-bearing inner container wall into individual elements (16) which are preferably the height of the wall, and of the floor into elongate elements (12) of equal width, is a necessary measure for meeting the requirement that it must be possible to check and repair the inner container frequently and indefinitely. The repair process is described below.

The air space or inspection and working chamber (4) between inner and outer containers (1, 2) is an essential part of the safety concept of this waste store. It contains the operating systems. The operating systems are:
charging
discharge
ventilation
chamber air monitoring
removal of percolating water
removal of dump gas.

They are described in detail.

"Charging" operating system

After the waste, which is supplied in any package desired, has been delivered to the plant, it generally passes through the following stations, not shown here:
registration
weighing
extraction of usable constituents
analysis of the waste
if necessary, moistening or solidification by mixing with other wastes
if necessary, transfer to other receptacles
conveyance by a charging tower (3) (FIG. 1) which can supply several containers in a group
take-over by a distribution crane (13) or the like, and
storage in the waste chamber (7) according to a given registered pattern.

The waste packing may e.g. consist of trailer containers which are emptied into the waste chamber (7), or bags or barrels.

"Discharge" operating system

When technical development progresses further, recovery of the wastes for economic use or to reduce quantities may be desirable. Recovery is carried out by the reverse method to charging.

Due to the self-contained system of the plant, from acceptance of the waste to storage and possible recovery there is no pollution of the environment as a result of gases and odours and also liquids.

"Ventilation" operating system

During the charging or discharge of waste, the inspection and working chamber (4) is to be ventilated artificially according to the load produced by gas formation, in such a way that the risk of explosion can be excluded. If the presence of employees is necessary during charging or discharge, these aspects are taken into consideration in ventilation as well. Quantities of air to be removed pass through a cleaning or washing system before the fraction which is purified in accordance with the current regulations is released into the atmosphere. Residues produced in this case must in certain circumstances be dumped again or burnt. The plant equipment needed for this is not shown here because it is placed outside the container, but forms part of the safety concept of the plant.

"Chamber air monitoring" operating system

According to the measurement results of chamber air monitoring, the air supply (ventilation) is controlled. In particular at the end of filling the inner container (2) and subsequent application of a gas-tight surface cover (15) (FIG. 1), if the seals (10) and (15) are intact no further noxious gases pass out of the inner container into the inspection and working chamber (4). It is conceivable to render this chamber inert at this point (e.g. with nitrogen). In any case, a change in air composition which is discovered by the chamber air monitoring system provides an indication of a leak in the sealing system (10 and 15), without regular visual checks becoming superfluous as a result.

"Percolating water removal" operating system

The quantities of percolating water, which are only small due to the absence of rainwater, are contained, at low points of the inner container floor formed by the floor elements (12), by perforated tubes made of the same material as the seal (10). Flow of percolating water is permitted and ensured in the long term by laying the filter plates (11) of the same material on the wall and floor seal (10) with sufficient spacing between the layers (10) and (11). Regular flushing of the spacer chamber is another safety measure. At the container walls, instead of the filter plates (11) extending over the circumference, in certain circumstances covering the vertical joints of the seal (10) with a filter strip is sufficient.

The percolating water contained in this way is collected in the pipe (8) and passed on for further treatment outside the container, where purification takes place in such a way that the purified liquid can be passed to a normal clarifying plant or the drainage canal. The residues are to be heat treated and/or dumped again.

"Dump gas removal" operating system

During charging, the inner container (2) is open at the top. Gas formed in this period is drawn off with the quantities of air to be removed from the ventilation system, and passed on for appropriate treatment. At the end of charging, a gas-permeable filter layer (14) (FIG. 1) is applied to the waste and then sealed in gas-tight relationship with the surface cover (15). At the upper points of this cover, the dump gas which is formed is collected by means of the pipe (9) and removed through the inspection and working chamber (4) and the outer container (1). Further treatment of the dump gas may be thermal utilisation or ordinary combustion, followed by cleaning of the resulting flue gases.

Repair process

Another safety element in addition to the operating systems described above is the possibility of regular visual checking of the wall of the inner container. (2) from the inspection and working chamber (4). For this purpose appropriate climbing means and platforms are installed in the chamber (4). The reinforced concrete elements (12) and (16) contain, in a regular pattern, inspection openings (17) which allow the sealing tightness of the liner (10) to be tested before any significant damage to the reinforced concrete material occurs.

In case of a leak discovered in the liner (10), the repair process is carried out (FIG. 4). In a first stage the waste in the more immediate vicinity of the element (18) to be repaired is solidified in such a way that it forms an arch (25) to the adjacent elements (19) not to be repaired. This can be achieved by freezing or chemical injection. Then the sealing plate (10) drawn into the inspection and working chamber (4) is divided up around the element (18). The supporting frames (20) concerned are folded back onto the outer container wall (1), after hydraulic supporting elements (22) have first been installed between the element (18) and the wall of the outer container (1). Furthermore, additional supports (26) are provided for the partly eliminated supporting elements (6) of the elements (19) which remain in place. By using lifting cables (23) in combination with the hydraulic supporting elements (22), the element (18) is moved into its repair position, a guide structure (27) of steel profiles serving to lock it in position.

This description applies to a wall element (!6 or 18) according to FIG. 4. A floor element (12) is repaired on the same principle.

When the element (18) has moved to its repair position, thorough inspection is carried out to define the extent of the damage precisely. Different orders of magnitude of damage are conceivable:

The filter plates (11) are faulty. They can be changed without problem.

The plate liner (21) has minor damage. On account of the conventional liner material HDPE with a thickness of 5 mm which is regarded as sensible, the defective parts can be removed and replaced by welding satisfactory material in place.

The plate liner (21) has damage over large areas. In this case the element (18) is completely covered with a new plate liner.

The eventuality of the concrete load-bearing element (18) being adversely affected to a significant extent, which is rather unlikely due to regular checking should also be taken into consideration. With this construction there is no problem in dismantling the whole element, removing it from the working chamber and then manufacturing and fitting a new one including plate liner (21) and inspection holes (17).

It must be emphasised that all the procedures described above take place in the protected working and inspection chamber (4) and the parts are accessible on all sides, so that quality control can be carried out at any time.

Between the solidified waste arch (25) or the filter plates (11) and the working and inspection chamber (4) can be installed temporarily, if necessary, a separating or barrier layer (24).

On the material of the plate liner (!0 or 21), it should also be pointed out that of course HDPE with a thickness of 5 mm is to be used preferably, but thicker plates of HDPE or use of the tougher PVDF are conceivable as well. This does not in any way alter the repair measures described.

After the repair has been made, the layer (24) used in some cases is removed and the element (!8) is returned to its original position, using the hydraulic supporting elements (22). Then the original supporting frames (20) are folded back to their standard position, and the sealing plates (21) of the repaired element (18) are welded back to those of the adjacent elements (19) from the working and inspection chamber (4). The repair process ends in examination of these weld seams. The aids for provisional support and displacement of the elements can be dismounted or transferred to another part requiring repair. The means for solidification of the waste can be switched off.

The repair process described can be carried out simultaneously or successively on several elements. Due to the fact that all inspections and repairs can be repeated as often as desired, and finally in the borderline case the whole inner container (2) can be renewed in this way, the system is highly redundant with respect to safety techniques.

In connection with the possibilities of repair. a few more points should be noted. On account of easy accessibility, a repair to the surface cover (15) does not require any special explanation. This also applies to the pipes (9) for collecting gas. The connection pieces embedded in the container floor elements (12) for collection of percolating water can be changed from the working and inspection chamber (4) without the elements having to be moved on that account. On the contrary, by means of a fitted change-over flange, the defective connection piece can be removed and a new one fitted.

Lastly FIG. 5 shows a container system for storing pretreated wastes according to concept (b). The above requirements of a container for dumping wastes pretreated in this way inevitably result in a simpler construction which according to the invention ensures protection of the waste (31) from entry of moisture permanently with the possibility of inspection at any time. It should also be mentioned that entry of moisture into the mineralised waste would result in loss of its immobility.

To solve this problem too, again the double-walled container is suitable, both container walls (32,33) being monolithic here. The outer container (33) assumes the essential protective functions by keeping external influences due to the weather away from the inner chamber, and removing the loads which fall on it. The inner container (32) has mainly load-bearing functions, by removing the loads from the contained waste preferably by a prestressed concrete wall construction (36) and a container floor (37) of reinforced concrete supported on annular walls (35). On account of the required immobility of the waste (31), the inner container (32) does not need any additional sealing layer. Charging with the mineralised waste (31) is preferably carried out pneumatically here, but can also take place in the same way as with the system for untreated wastes. Recovery of the wastes can be carried out likewise.

The inspection and working chamber (34), which in this case does not need any supports between inner (36) and outer (33) walls, contains as an essential additional operating system a natural air circulation system to maintain an internal air moisture content with an upper limit.

Regular inspection of the necessary sealing of the outer wall (33), which can be repeated at any time, is carried out with an inspection trolley of adjustable height, not shown here, anchored to the upper edge of the inner container. Any repairs to the outer container (33) are carried out conventionally by injecting the cracks with synthetic resin mortar. As an additional safety measure, the surface of the waste (31) can be covered with a HDPE sheet (38).

Even if the proposed container systems are designed above ground, which is also technically preferable, it must be emphasised that underground constructions or those which are partially poured in are feasible as well, without basically altering the overall concept in any way as a result.

We claim:

1. A container for storing substances comprising:
   an inner casing having a plurality of separable elements for containing the stored substances;
   an outer casing, spaced apart from the inner casing, opposite the stored substances for supporting the inner casing, the space between the inner and outer casings being large enough to allow access to the separable elements of the inner casing; and
   at least one supporting element extending between the inner and outer casing for supporting the inner casing against the outer casing.

2. The container of claim 1 wherein the inner casing is cylindrical.

3. The container of claim 2 wherein the lining layer comprises HDPE.

4. The container of claim 3 wherein the lining layer is approximately 5 mm to 10 mm thick.

5. The container of claim 1 wherein the inner casing comprises a lining layer between the separable elements and the stored substances for protecting the separable elements.

6. The container of claim 5 wherein the lining layer comprises PVDF.

7. The container of claim 5 wherein the separable elements comprise openings which allow the condition of the lining to be monitored from the space between the inner and outer casings.

8. The container of claim 1 wherein the inner casing comprises a lining layer for isolating the space between the inner and outer casings from the stored substances.

9. The container of claim 1 wherein the inner casing comprises a filter layer spaced apart from the separable elements and the stored substances defining a spacer chamber for containing the stored substances while allowing fluids to flow away from the stored substances into the spacer chamber.

10. The container of claim 9 further comprising a pipe for conveying fluid collected in the spacer chamber out of the container.

11. The container of claim 9 wherein the filter layer is adapted to be flushed.

12. The container of claim 11 wherein the at least one supporting element supporting a separable element can be removed from the inner casing.

13. The container of claim 11 wherein the at least one supporting element supporting a separable element can be altered in geometry to allow removal of the supported separable element from the inner casing.

14. The container of claim 13 wherein the at least one supporting element supporting a separable element can be altered in geometry by being folded towards the outer casing.

15. The container of claim 13 further comprising a lining layer between the separable element and the stored substances for containing the stored substances when the separable element is removed from the inner casing.

16. The container of claim 1 further comprising at least one gas pipe for conveying gases formed by the stored substances from the inner casing out of the container.

17. The container of claim 1 wherein at least one supporting element extends between a separable element of the inner casing and the outer casing for supporting the separable element.

18. The container of claim 1 wherein the outer casing is formed primarily of concrete.

19. The container of claim 1 wherein the separable elements are formed primarily of concrete.

20. A container for storing wastes comprising:
    an inner casing defined by walls having a plurality of separable wall elements;
    an outer casing substantially surrounding the walls of the inner casing and spaced apart therefrom for supporting the walls of the inner casing;
    a plurality of supporting elements extending between the outer casing and the separable wall elements of the inner casing and adapted to be alterable to allow a separable wall element to be separated from the inner casing and moved into the space between the inner and outer casings; and
    a lining layer between the separable wall elements and the stored wasted for containing the stored wastes when a separable wall element is separated from the casing.

21. The container of claim 20 further comprising a filter layer between the lining layer and the stored wastes defining a spacer chamber between the lining layer and the stored wastes, the filter layer containing the stored wastes while allowing fluids to flow into the spacer chamber and means for conducting fluid within the spacer chamber out of the container.

22. The container of claim 20 wherein the separable wall elements comprise inspection openings which allow the lining layer to be monitored from the space between the inner and outer casings.

* * * * *